United States Patent
Ryan (10) Patent No.: US 7,093,082 B2
(45) Date of Patent: Aug. 15, 2006

(54) MICROPROGRAMMABLE SDRAM MEMORY INTERFACE CONTROLLER

(75) Inventor: Robert T. Ryan, Langhorne, PA (US)

(73) Assignee: Matsushita Electric Industrial Co., LTD, Osaka (JP)

( * ) Notice: Subject to any disclaimer, the term of this patent is extended or adjusted under 35 U.S.C. 154(b) by 490 days.

(21) Appl. No.: 10/458,999

(22) Filed: Jun. 11, 2003

(65) Prior Publication Data

US 2004/0255077 A1   Dec. 16, 2004

(51) Int. Cl.
   *G06F 12/00*   (2006.01)
   *G06F 9/26*   (2006.01)
(52) U.S. Cl. .................. 711/147; 718/101; 718/102; 711/105; 711/150; 711/217; 711/221
(58) Field of Classification Search ............... None
   See application file for complete search history.

(56) References Cited

U.S. PATENT DOCUMENTS

| | | | |
|---|---|---|---|
| 6,487,648 B1 | 11/2002 | Hassoun | |
| 6,545,932 B1 | 4/2003 | Sunaga et al. | |
| 6,606,691 B1 * | 8/2003 | Didier et al. | 711/151 |
| 6,618,778 B1 * | 9/2003 | MacCormack | 710/244 |
| 6,779,089 B1 * | 8/2004 | Lin et al. | 711/152 |
| 2002/0007435 A1 | 1/2002 | Banks et al. | |

OTHER PUBLICATIONS

Microsoft Computer Dictionary, 2002, Microsoft Press, Fifth Edition, p. 469.*
NEC Corporation; "NEC Data Sheet, MOS Integrated Circuit"; Document No. M12939EJ3VODs00 (3rd Edition); Published Apr. 1998; (pp. 11-34).

* cited by examiner

*Primary Examiner*—Reginald G. Bragdon
*Assistant Examiner*—Shawn Gu
(74) *Attorney, Agent, or Firm*—RatnerPrestia (57) ABSTRACT

An SDRAM controller includes a service unit for receiving an SDRAM service request from at least one requester; a memory for storing instructions for performing a plurality of SDRAM transactions; and a lookup table of a sequence of addresses corresponding to at least a portion of the instructions stored in the memory, the portion of the instructions defining the SDRAM transaction. The service unit is configured to execute the SDRAM transaction based on the sequence of addresses in the lookup table. Also included is an arbiter for receiving service requests from multiple requestors to access the SDRAM, and another lookup table of identifiers corresponding to the multiple requestors, the identifiers stored in another sequence of addresses. The arbiter is configured to sequentially access each address in the other sequence of addresses, and grant service to a requestor based on an identifier stored in an address accessed.

20 Claims, 5 Drawing Sheets

MICROPROGRAMMABLE SDRAM MEMORY INTERFACE CONTROLLER

TECHNICAL FIELD

The present invention relates, in general, to synchronous dynamic random access memory (SDRAM) and, more specifically, to an SDRAM controller that is microprogrammable.

BACKGROUND OF THE INVENTION

SDRAM is a generic name for various kinds of dynamic random access memories (DRAM) that are synchronized with the clock speed of a microprocessor. In this manner, an SDRAM increases the number of instructions that the microprocessor may perform in a given time.

Typically, SDRAMs are fabricated as separate integrated circuits from other system components. The SDRAMs, microprocessor, and other components of the system are interconnected via a system bus. An SDRAM controller, which is placed between the system bus and the SDRAM, facilitates communication between the microprocessor and the SDRAM, and controls the functioning of the SDRAM. Many of the SDRAM controllers are application specific integrated circuits (ASICs), each providing specific functionality for a predetermined SDRAM.

The memory in the SDRAM is organized in banks. Typically, the number of memory banks may range from 2 to 16, or more. Corresponding to each of these SDRAM banks, there is a memory request queue in the SDRAM controller. A memory request basically involves a row address strobe (RAS) command and a column address strobe (CAS) command for accessing data in a memory bank. The controller has a request scheduler and a RAS/CAS generator which processes requests for all the memory banks in an orderly and timely manner. To control the operation of an SDRAM, the controller may use standard signals, such as address, row address select (RAS), column address select (CAS), write enable (WE), and data input/output mask (DQM) assertions.

The controller, typically, may handle multiple requests from different requestors, such as multiple processors. The controller may arbitrate among these different requestors and grant service (reading data from or writing data to a memory bank) to each requestor in an orderly manner.

In an SDRAM, when a row address and a column address of the initial data have been specified, subsequent addresses are automatically generated to output data in succession synchronously to a clock. The number of data (burst length) provided in succession may be selected by a number, such as 2, 4, or 8. In a burst mode for data accesses synchronously to the clock, data may be read out at a higher speed, since data are accessible per clock.

Because SDRAM memory cells are capacitive, the charge they contain dissipates with time. As the charge is lost, so is the data in the memory cells. To prevent this from happening, an SDRAM must be refreshed. This is done by periodically restoring the charge on the individual memory cells. In addition, the SDRAM may use a feature called auto pre-charge, which allows the memory chip circuitry to close a page automatically at the end of a burst. Auto pre-charge may be used, because the burst transfers are of a fixed length, and the end time of the transfers is known.

Long lead times are typically required to develop and manufacture a custom device, such as an SDRAM controller. Moreover, by the time the SDRAM controller is commercially available, new features may be introduced into the SDRAM, thereby necessitating another design and development of the SDRAM controller and causing more expense. Furthermore, in a multiple requestor environment, the requirement of each requestor for accessing data may change, thereby necessitating yet another design and development phase and causing even more expense.

A need arises, therefore, for a controller that may be used in an application/project and reused in another application/project, without having to undergo an expensive design and development phase. A need also arises for a controller that may accommodate changing needs of a data requestor, as well as the addition or deletion of a data requestor. This invention addresses such needs.

SUMMARY OF THE INVENTION

To meet this and other needs, and in view of its purposes, the present invention provides a programmable synchronous dynamic random access memory (SDRAM) controller including an arbitration unit for receiving service requests from multiple requestors to access an SDRAM, and a lookup table of identifiers corresponding to the multiple requestors, in which the identifiers are stored in a sequence of addresses. The arbitration unit is configured to sequentially access each address in the sequence of addresses, and grant service to a requestor, based on an identifier stored in an address accessed.

In another embodiment, the present invention provides an SDRAM controller including a service unit for receiving a service request from at least one requestor to access an SDRAM and perform an SDRAM transaction; a memory for storing instructions at various addresses of the memory, the instructions used for performing a plurality of SDRAM transactions; and a lookup table of a sequence of addresses corresponding to at least a portion of the instructions stored in the memory, the portion of the instructions defining the SDRAM transaction. The service unit is configured to execute the SDRAM transaction based on the sequence of addresses in the lookup table. The SDRAM controller may also include a service unit for receiving service requests from multiple requestors to access the SDRAM, and another lookup table of identifiers corresponding to the multiple requestors, the identifiers stored in another sequence of addresses. The service unit is configured to sequentially access each address in the other sequence of addresses, and grant service to a requestor based on an identifier stored in an address accessed.

In yet another embodiment, the invention provides a method of controlling access to an SDRAM. The method includes the steps of: (a) receiving service requests from multiple requestors to access the SDRAM; (b) storing a sequence of identifiers in a lookup table, the identifiers corresponding to the multiple requestors; (c) sequentially accessing the sequence of identifiers in the lookup table; and (d) granting a requestor access to the SDRAM based on an identifier accessed in the sequence of identifiers.

In still another embodiment, the invention provides a method of controlling access to an SDRAM. The method includes the steps of: (a) receiving a service request from at least one requestor to access the SDRAM and perform an SDRAM transaction; (b) storing, in a first memory, instructions at various addresses, the instructions used for performing a plurality of SDRAM transactions; (c) storing, in a second memory, a sequence of addresses corresponding to at least a portion of the instructions stored in the first memory, the sequence of addresses defining the SDRAM transaction;

and (d) executing the SDRAM transaction based on the sequence of addresses stored in the second memory.

In a further embodiment, the invention provides a method of programming an SDRAM controller. The method includes the steps of: (a) identifying a plurality of requestors to access the SDRAM, wherein each of the requestors is configured to perform a sequence of instructions; (b) storing, in a first memory, a plurality of instructions for controlling the SDRAM, each instruction stored at a different address in the first memory; (c) storing, in a second memory, a plurality of sequences of addresses, each sequence of addresses corresponding to a sequence of instructions stored in the first memory; and (d) performing a sequence of instructions for a requestor by using a sequence of addresses stored in the second memory to execute a corresponding sequence of instructions stored in the first memory.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

In accordance with the present invention, a microprogrammable SDRAM memory interface controller is provided. The microprogrammable features of the invention provide flexibility for using the controller across multiple applications or projects, thereby reducing or eliminating a need for hardware redesign. The present invention may advantageously be used in applications or projects that have uncertain requirements or are subject to future revision and enhancement.

Figure 1:
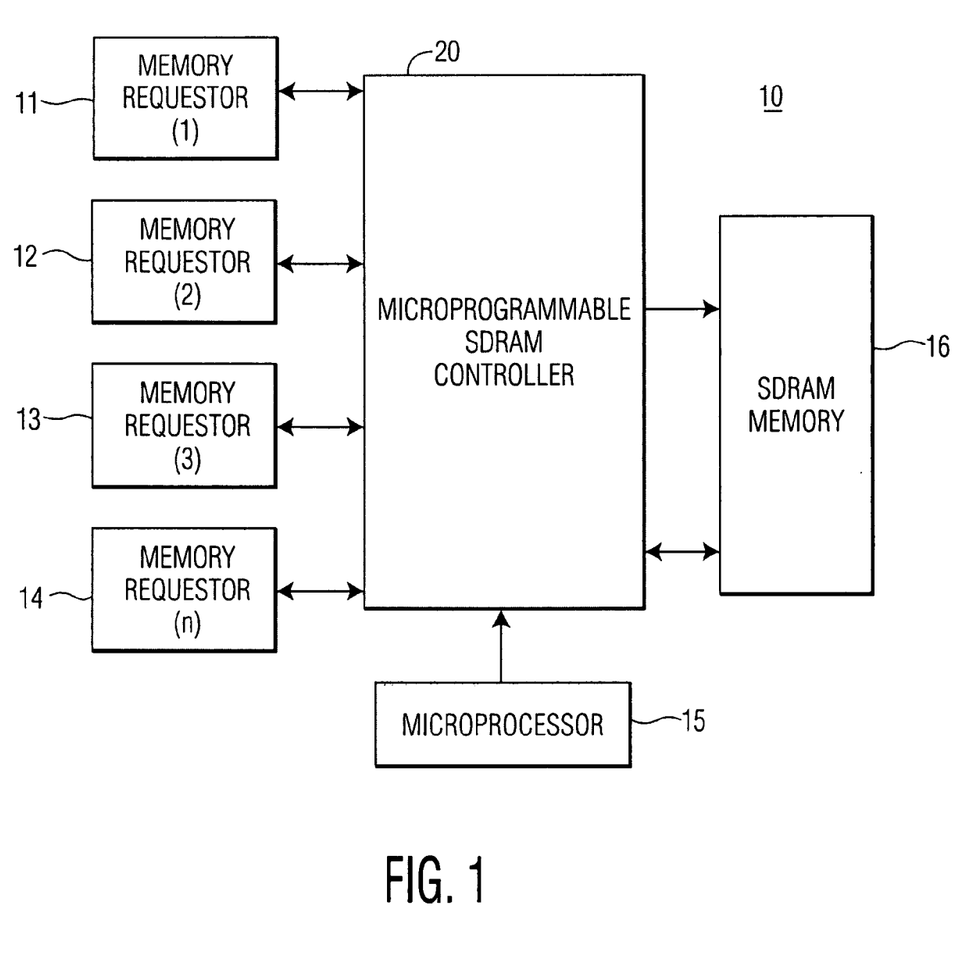
FIG. 1 is a block diagram of a processing system incorporating a microprogrammable SDRAM controller, in accordance with an embodiment of the invention.

Referring to FIG. 1, there is shown a processing system, generally designated as 10, in accordance with an embodiment of the present invention. Processing system 10 includes microprogrammable SDRAM controller 20 coupled between multiple memory requestors (generally designated as 11 to 14) and SDRAM memory 16. In a typical embodiment, microprocessor 15 may also be coupled to microprogrammable controller 20.

Microprocessor 15 may be, for example, an Intel processor. As will be explained, microprocessor 15 may be used to store various instructions into SDRAM controller 20 and be programmed to execute specific instructions for reading/writing from/to the SDRAM memory for each memory requestor. Microprocessor 15 may also be used to store access priorities into the SDRAM controller for the requestors, so that SDRAM controller 20 may arbitrate among the multiple requestors for access to the SDRAM memory.

It will be appreciated that memory requestors 11 through 14 and SDRAM memory 16, as well as microprocessor 15, are not necessarily physically in proximity to SDRAM controller 20.

Figure 2:
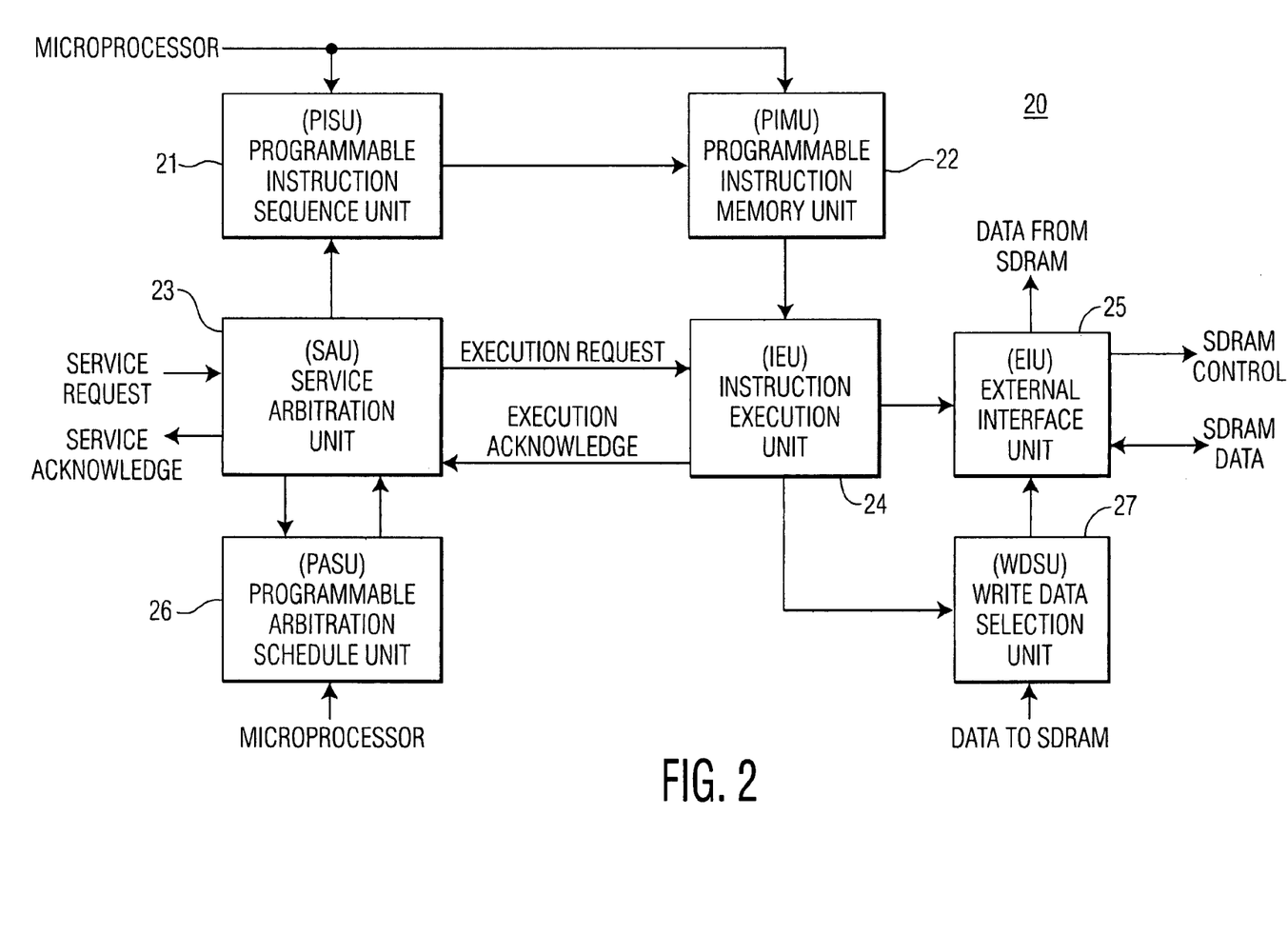
FIG. 2 is a block diagram of a microprogrammable SDRAM controller, in accordance with an embodiment of the invention.

Referring next to FIG. 2, there is shown SDRAM controller 20 in accordance with an embodiment of the present invention. SDRAM controller 20 includes the service arbitration unit (SAU), which is generally designated as 23, and is coupled between the programmable instruction sequence unit (PISU), generally designated as 21, and the programmable arbitration schedule unit (PASU), generally designated as 26. Also included are the programmable instruction memory unit (PIMU), generally designated as 22, which is coupled between PISU 21 and the instruction execution unit (IEU), generally designated as 24. SDRAM controller 20 further includes the external interface unit (EIU), generally designated as 25, and the write data selection unit (WDSU), generally designated as 27, both coupled to IEU 24.

SAU 23 is configured to receive service requests from one or more requestors by way of the service request lines (only one shown). A service request may arrive one at a time, or multiple requests may arrive concurrently. As will be explained, the SAU arbitrates among the requestors and grants access to one and only one of the requestors at any given time. Access may be granted based on a programmable schedule that establishes priorities among the service requestors.

PASU 26 provides the schedule to the SAU in the form of a lookup table stored in memory. An example of a lookup table, which may be externally programmed by a user, is shown in Table 1. As shown, the table includes 16 addresses and each address includes a corresponding priority service ID. It will be appreciated that each service ID (A–R are shown) may be, but does not have to be, a different requestor. Accordingly, up to 16 different requestors may be programmed into the schedule shown in table 1. For example, at address 0, requestor A has the highest priority, at address 1, requestor B has the highest priority, and so on.

TABLE 1

| programmable schedule as a lookup table, stored in PASU | |
|---|---|
| ADDRESS | PRIORITY SERVICE ID |
| 0 | A |
| 1 | B |
| 2 | C |
| 3 | D |
| 4 | E |
| 5 | F |
| 6 | G |
| 7 | H |
| 8 | J |
| 9 | K |
| 10 | L |
| 11 | M |
| 12 | N |
| 13 | P |
| 14 | Q |
| 15 | R |

In operation, the SAU addresses the PASU lookup table in sequence. Thus, at time zero, the address points to address zero. At address zero, requestor A has the highest priority. Addressing the PASU lookup table with an address of zero, the SAU is informed that requestor A has the highest priority. If multiple requestors, for example A and B, concurrently request service, A is granted the service by the SAU. After A is granted service and completes reading or writing data from/to the SDRAM, the SAU addresses the PASU lookup table with the next address, namely address 1. The SAU is then informed that requestor B has the highest priority. If multiple requestors request service, while the SAU is addressing address 1, requestor B is granted the service. After requestor B completes execution, the address is incremented to the next address, namely address 2 in the table. If requestor C requests service simultaneously with other requestors, requestor C with the highest priority service ID is granted the service request. Accordingly, the input and output operation, as shown in Table 2, between the SAU and the PASU, may be considered as sequencing through a sequence of addresses, or moving down a schedule, beginning at address O and ending at address 15.

TABLE 2

Input/output operation between the SAU and the PASU

| INPUT SCHEDULE ADDRESS | OUTPUT PRIORITY SERVICE |
|---|---|
| 0 | A |
| 1 | B |
| 2 | C |
| 3 | D |
| 4 | E |
| 5 | F |
| 6 | G |
| 7 | H |
| 8 | J |
| 9 | K |
| 10 | L |
| 11 | M |
| 12 | N |
| 13 | P |
| 14 | Q |
| 15 | R |

It will be appreciated that in a situation where the input address is pointing to address 0, and requestor A is inactive but other requestors are requesting service, the SAU may invoke a rule to determine who should be granted the service. The rule may be, for example, that priority is granted to a least recently used (LRU) requestor among the remaining service requestors.

In an embodiment contemplated by the invention, the priority service ID value of table 1 is programmable. The schedule address sequence of table 2 is fixed and advances in sequence upon the SAU completing a service for a requestor, by using a priority service acknowledge. The priority service IDs, however, may be programmed in any manner desirable by a user. Moreover, if the priority service request for a requestor at a corresponding address is inactive, priority may follow a LRU rule among the remaining service requestors.

Since the priority service ID shown in table 1 is programmable, it will be appreciated that requestor A, for example, may be granted a higher percentage of service requests than other requestors (for example B, C, D and E) by inserting into table 1 mostly "A" priority IDs. Thus, the sequence in table 1 may be programmed, for example, as "A,A,A,A,B, C,D,E". Similarly, requestor B may be starved, or provided no access, by omitting B from the table. Accordingly, the amount of resource provided each requestor may be manipulated by changing the priority service IDs in table 1. (Of course, if table 1 is changed, the content of table 2 is correspondingly changed.)

Similar to PASU 26, PISU 21 is a programmable unit that provides an array of sequences in a lookup table, stored in memory. As shown in table 3, each service ID (or requestor) has a unique group of 16 position codes that are used to select 16 addresses in PIMU 22. Thus, requestor A has programmable position codes $A_0$–$A_{15}$, requestor B has programmable position codes $B_0$–$B_{15}$, and so on.

TABLE 3

Programmable sequence as a lookup table stored in the PISU

| ID | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A | A0 | A1 | A2 | A3 | A4 | A5 | A6 | A7 | A8 | A9 | A10 | A11 | A12 | A13 | A14 | A14 |
| B | B0 | B1 | B2 | B3 | B4 | B5 | B6 | B7 | B8 | B9 | B10 | B11 | B12 | B13 | B14 | B15 |
| C | C0 | C1 | C2 | C3 | C4 | C5 | C6 | C7 | C8 | C9 | C10 | C11 | C12 | C13 | C14 | C15 |
| D | D0 | D1 | D2 | D3 | D4 | D5 | D6 | D7 | D8 | D9 | D10 | D11 | D12 | D13 | D14 | D15 |
| E | E0 | E1 | E2 | E3 | E4 | E5 | E6 | E7 | E8 | E9 | E10 | E11 | E12 | E13 | E14 | E15 |
| F | F0 | F1 | F2 | F3 | F4 | F5 | F6 | F7 | F8 | F9 | F10 | F11 | F12 | F13 | F14 | F15 |
| G | G0 | G1 | G2 | G3 | G4 | G5 | G6 | G7 | G8 | G9 | G10 | G11 | G12 | G13 | G14 | G15 |
| H | H0 | H1 | H2 | H3 | H4 | H5 | H6 | H7 | H8 | H9 | H10 | H11 | H12 | H13 | H14 | H15 |
| J | J0 | J1 | J2 | J3 | J4 | J5 | J6 | J7 | J8 | J9 | J10 | J11 | J12 | J13 | J14 | J15 |
| K | K0 | K1 | K2 | K3 | K4 | K5 | K6 | K7 | K8 | K9 | K10 | K11 | K12 | K13 | K14 | K15 |
| L | L0 | L1 | L2 | L3 | L4 | L5 | L6 | L7 | L8 | L9 | L10 | L11 | L12 | L13 | L14 | L15 |
| M | M0 | M1 | M2 | M3 | M4 | M5 | M6 | M7 | M8 | M9 | M10 | M11 | M12 | M13 | M14 | M15 |
| N | N0 | N1 | N2 | N3 | N4 | N5 | N6 | N7 | N8 | N9 | N10 | N11 | N12 | N13 | N14 | N15 |
| P | P0 | P1 | P2 | P3 | P4 | P5 | P6 | P7 | P8 | P9 | P10 | P11 | P12 | P13 | P14 | P15 |
| Q | Q0 | Q1 | Q2 | Q3 | Q4 | Q5 | Q6 | Q7 | Q8 | Q9 | Q10 | Q11 | Q12 | Q13 | Q14 | Q15 |
| R | R0 | R1 | R2 | R3 | R4 | R5 | R6 | R7 | R8 | R9 | R10 | R11 | R12 | R13 | R14 | R15 |

As will be explained, each position code is an address in PIMU 22 that points to an instruction. Accordingly, up to 16 different instructions may be addressed by the PISU for each requestor. Although in the embodiment shown 16 different instructions may be programmed for each requestor, it will be appreciated that fewer instructions may generally be used. For example, requestor A may require position codes $A_0$–$A_6$ (seven instructions), requestor B may require position codes $B_0$–$B_3$ (four instructions), and so on.

Furthermore, position code $A_0$ and position code $B_0$, for example, may point to an address containing a single instruction in PIMU 22, or may point to different addresses containing different instructions in PIMU 22. In this manner, the number of instructions stored in PIMU 22 may be reduced, since only different instructions need to be stored in the PIMU. The position codes of each requestor may be dynamically adapted to string together any set of instructions that are stored in PIMU 22. In this manner, the invention provides a set of position codes that are tailored to the needs of each requestor and advantageously allows the user to uniquely program any particular service requested by a requestor.

Referring next to table 4, there is shown the input/output operation provided from the SAU, via the PISU, to the PIMU. For each service ID (or requestor), the SAU provides the PISU a sequence of position codes as inputs and, in turn, the PISU provides a sequence of addresses (for example $A_0$–$A_{15}$) as outputs to the PIMU. If requestor B, for example, is being serviced by the SAU, then service ID "B" and position codes $B_0$–$B_{15}$ (for example) are sequentially provided to PIMU 22. In this manner, requestor B may execute its own set of instructions to read/write data to/from the SDRAM. Each of position codes $B_0$–$B_{15}$ is an address in the memory of PIMU 22. As already discussed, another requestor, for example C, may have position codes $C_0$–$C_{15}$, which may be addresses in the PIMU that are identical to the addresses pointed to by $B_0$–$B_{15}$, respectively. In such circumstance, requestor C may be programmed to have an identical sequence of instructions as requestor B (for example).

In an embodiment of the invention, the sequence of position codes for a requestor may be used to select a unique group or set of 16 PIMU addresses. The PIMU address values are programmable. The first position code of a PISU sequence is always zero and the last position code of a PISU sequence may be programmed. The last position code of a PISU sequence may be determined by an end code value.

The position code may be incremented to the next position code by the SAU, upon generation of an execution request from the SAU to IEU 24, as shown in FIG. 2. The IEU may perform an SDRAM transaction, defined as an execution of a sequence of position codes, which, in turn, is a sequence of PIMU addresses, shown in table 4, that select a sequence of PIMU instructions.

TABLE 4

Input/output operation of the PISU

| | INPUT | OUTPUT |
|---|---|---|
| SERVICE ID | SEQUENCE POSITION CODE | PIMU ADDRESS |
| A | 0 | A0 |
| | 1 | A1 |
| | 2 | A2 |
| | 3 | A3 |

TABLE 4-continued

Input/output operation of the PISU

| | INPUT | OUTPUT |
|---|---|---|
| SERVICE ID | SEQUENCE POSITION CODE | PIMU ADDRESS |
| | 4 | A4 |
| | 5 | A5 |
| | 6 | A6 |
| | 7 | A7 |
| | 8 | A8 |
| | 9 | A9 |
| | 10 | A10 |
| | 11 | A11 |
| | 12 | A12 |
| | 13 | A13 |
| | 14 | A14 |
| | 15 | A15 |
| B | 0 | B0 |
| | 1 | B1 |
| | 2 | B2 |
| | 3 | B3 |
| | 4 | B4 |
| | 5 | B5 |
| | 6 | B6 |
| | 7 | B7 |
| . | | |
| . | | |
| . | | |
| R | 8 | R8 |
| | 9 | R9 |
| | 10 | R10 |
| | 11 | R11 |
| | 12 | R12 |
| | 13 | R13 |
| | 14 | R14 |
| | 15 | R15 |

Similar to the PISU, PIMU 22 is a programmable lookup table stored in a memory. As shown in Table 5, PIMU 22 includes 32 addresses each storing an output instruction. For example, address 0 includes instructions $I_0$, address 1 includes instruction $I_1$, address 2 includes instruction $I_2$, and so on. Although the embodiment of table 5 shows 32 instructions, the invention may be expanded to include more memory for an increased number of instructions. It will be appreciated, however, that typically an SDRAM transaction is a sequence of no more than 9 instructions (based on a set of instructions as shown, for example, in table 9).

TABLE 5

Programmable instructions in a lookup table stored in the PIMU

| INPUT ADDRESS | OUTPUT INSTRUCTION |
|---|---|
| 0 | I0 |
| 1 | I1 |
| 2 | I2 |
| 3 | I3 |
| 4 | I4 |
| 5 | I5 |
| 6 | I6 |
| 7 | I7 |
| 8 | I8 |
| 9 | I9 |
| 10 | I10 |
| 11 | I11 |
| 12 | I12 |
| 13 | I13 |
| 14 | I14 |
| 15 | I15 |
| 16 | I16 |

TABLE 5-continued

Programmable instructions in a lookup table stored in the PIMU

| INPUT ADDRESS | OUTPUT INSTRUCTION |
|---|---|
| 17 | I17 |
| 18 | I18 |
| 19 | I19 |
| 20 | I20 |
| 21 | I21 |
| 22 | I22 |
| 23 | I23 |
| 24 | I24 |
| 25 | I25 |
| 26 | I26 |
| 27 | I27 |
| 28 | I28 |
| 29 | I29 |
| 30 | I30 |
| 31 | I31 |

An example of PIMU instruction is shown in Tables 6–8. An instruction, as exemplified, consists of 19 bits. Bits 0–5 define the duration of the instruction in terms of clock cycles. Bit 13 is the row address strobe (RAS) enable, bit 12 is the column address strobe (CAS) enable, and bit 11 is the write enable (WEN). Bits 7–10 are data mask bytes 0–3. BA is defined as bank address.

TABLE 6

An example of a PIMU instruction format

| BIT(s) | FUNCTION | DEFINITION |
|---|---|---|
| 18 | Read Data Type Instruction | 0 = Inactive, 1 = Active |
| 17 | Write Data Type Instruction | 0 = Inactive, 1 = Active |
| 16 | Address Control | See Table 7 |
| 15 | Bank Precharge Control | See Table 8 |
| 14 | SDRAM Signal CKE Level | 0 = Low, 1 = High |
| 13 | SDRAM Signal RAS Level | 0 = Low, 1 = High |
| 12 | SDRAM Signal CAS Level | 0 = Low, 1 = High |
| 11 | SDRAM Signal WEN Level | 0 = Low, 1 = High |
| 10 | SDRAM Signal DQM3 Level | 0 = Active, 1 = Inactive |
| 9 | SDRAM Signal DQM2 Level | 0 = Active, 1 = Inactive |
| 8 | SDRAM Signal DQM1 Level | 0 = Active, 1 = Inactive |
| 7 | SDRAM Signal DQM0 Level | 0 = Active, 1 = Inactive |
| 6 | SDRAM Signals DATA(31:0) Direction Control | 0 = In(read), 1 = Out(write) |
| 5:0 | Instruction Duration | Clock_Cycles + 1 |

TABLE 7

Bit 16, address control

| VALUE | SDRAM COMMAND | DEFINITION |
|---|---|---|
| 1 | "Activate" or "Mode Register Set" | SDRAM Signals BA(1:0) = Internal Address (20:19) = Bank<br>SDRAM Signals ADDR(10:0) = Internal Address (18:8) = Row |
| 0 | "Read", "Write", or "Precharge" | SDRAM Signals BA(1:0) = Internal Address (20:19) = Bank<br>SDRAM Signals ADDR(10) = Bank Precharge Control<br>SDRAM Signals ADDR(9:8) = Internal Address(9:8)<br>SDRAM Signals ADDR(7:0) = Internal Address(7:0) = Column |
| X | Others | Value Irrelevant |

TABLE 8

Bit 15, bank precharge control

| SDRAM COMMAND | DEFINITION |
|---|---|
| "Read" or "Write" | 0 = Auto Precharge Disable, 1 = Auto Precharge Enable |
| "Precharge" | 0 = Precharge Current Bank, 1 = Precharge Both Banks |
| Others | Value Irrevelant |

Details of instruction formats and typical command instructions (as in table 9) may be found in different SDRAM specifications provided by manufacturers. One such specification is NEC Data Sheet of 16M-bit Synchronous DRAMs provided by NEC Corporation, Document No. M12939EJ3V0DS00 (third edition), published in April 1998, which is incorporated herein by reference in its entirety.

Referring again to FIG. 2, PIMU 22 may store any set of instructions for an SDRAM, including instructions that may be different from those shown in table 9. Based on the programmed sequence stored in PISU 21, each requestor may construct or execute its own SDRAM transaction. With respect to the instructions exemplified in table 9, the instructions may be arranged in any sequence of PIMU address values for each sequence of position codes per requestor.

TABLE 9

Typical SDRAM command instructions

| | DEFINITION | | | | | |
|---|---|---|---|---|---|---|
| COMMAND | CKE | RAS | CAS | WEN | DQM(3:0) | ADDR(12:0) |
| ACTIVATE | 1 | 0 | 1 | 1 | X | Bank/Row |
| AUTO REFRESH | 1 | 0 | 0 | 1 | X | x |
| MODE REGISTER SET | 1 | 0 | 0 | 0 | X | Bank/Row |
| NOP | 1 | 1 | 1 | 1 | X | x |
| PRECHARGE | 1 | 0 | 1 | 0 | X | Bank/Column |
| READ | 1 | 1 | 0 | 1 | 0 or 1 | Bank/Column |
| SELF REFRESH | 0 | 0 | 0 | 1 | X | x |
| TERMINATE | 1 | 1 | 1 | 0 | X | x |
| WRITE | 1 | 1 | 0 | 0 | 0 or 1 | Bank/Column |

Each instruction is provided to IEU 24 by PIMU 22. The instruction is executed upon receiving an execution request from SAU 23 to IEU 24. When the IEU completes executing the instruction, the IEU provides an execution acknowledge to the SAU. An execution acknowledge is returned to the SAU from the IEU for every execution request of an instruction. The SAU increments the PISU position code (input to the PISU), so that the IEU may receive the next instruction in the sequence, as an output from the PIMU. Upon the next execution request, the IEU begins executing that next instruction provided from the PIMU.

The IEU continues to execute the instructions, until the SAU determines that the last instruction had been executed. Arrival of the last instruction may be determined by the SAU, based on a last PISU address comparison (as described later, with reference to register 42 shown in FIG. 4). After detecting the last PISU address, the SAU may be ready to receive and arbitrate the next service request(s).

As necessary, IEU 24 provides control to EIU 25 and WDSU 27. During a read instruction, the EIU is enabled to receive SDRAM data and transmit the received data to the appropriate requestor. During a write instruction, WDSU 27 is enabled to receive data from the appropriate requestor and pass the received data, via EIU 25, to the SDRAM.

Figure 3:
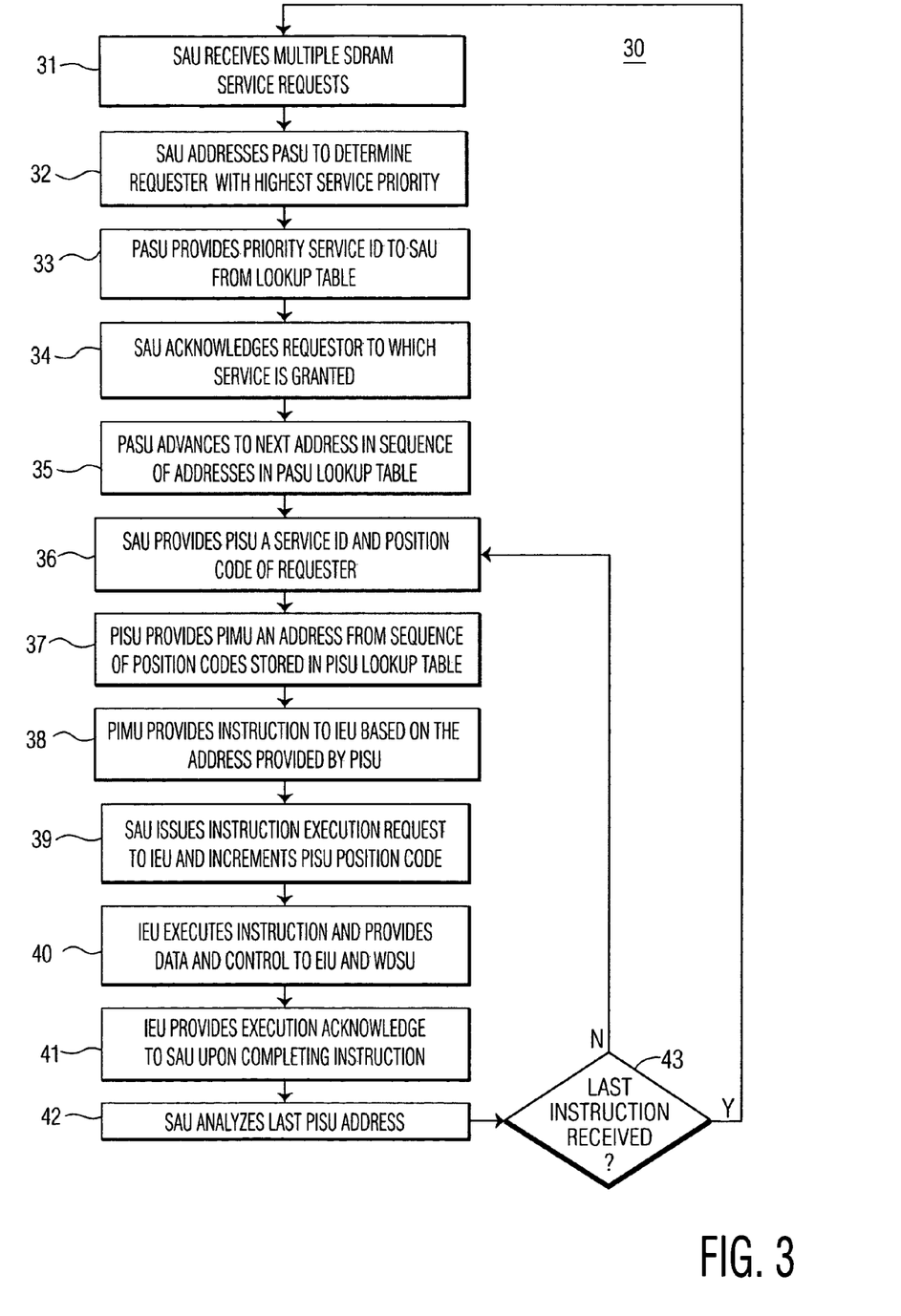
FIG. 3 is a flow diagram depicting a method used by a microprogrammable SDRAM controller, in accordance with an embodiment of the invention.

Referring now to FIG. 3, there is shown method 30 provided by the invention for operation of SDRAM controller 20 of FIG. 2. As shown, method 30 enters step 31, in which the SAU may receive multiple SDRAM service requests. The method enters step 32, in which the SAU addresses the PASU to determine which requestor has the highest service priority. The method, at next step 33, provides a priority service ID to the SAU based on a lookup table stored in the PASU. The SAU selects a requestor, based on the priority service ID, by acknowledging the requestor and granting service to the requestor (step 34).

After acknowledging the requestor in step 34, the PASU advances to the next address in the sequence of addresses in its lookup table (step 35). Depending on the selected service ID priority, the method by way of the SAU provides a position code of the requestor to the PISU (step 36). The PISU, in turn, provides an address to the PIMU based on the sequence of position codes stored in the PISU lookup table (step 37).

In step 38, the PIMU provides an instruction (output) to the IEU, based on the address (input) provided from the PISU. In step 39, the SAU issues an instruction execution request to the IEU and then increments the PISU position code. Next, step 40 of the method, by way of the IEU, executes the instruction, providing data and control to the EIU and the WDSU, as appropriate.

Upon completing the instruction, the IEU provides an execution acknowledge to the SAU in step 41. This handshake between the IEU and the SAU is repeated for every instruction. When the SAU detects the last PISU address, in step 42, the method branches to decision box 43, having become aware that the last instruction for a requestor has been received.

So long as the last instruction is not received, the method branches back to step 36. During step 36, the SAU provides the PISU with the next position code in the sequence, so that the requestor may execute the next instruction in the sequence. If decision box 43, on the other hand, determines that the last instruction has been received, method 30 branches back to step 31 having becoming aware that the SDRAM transaction for the particular requestor is finished. The SAU is ready to receive the next SDRAM service request(s) and arbitrate which requestor should be granted service.

Figure 4:
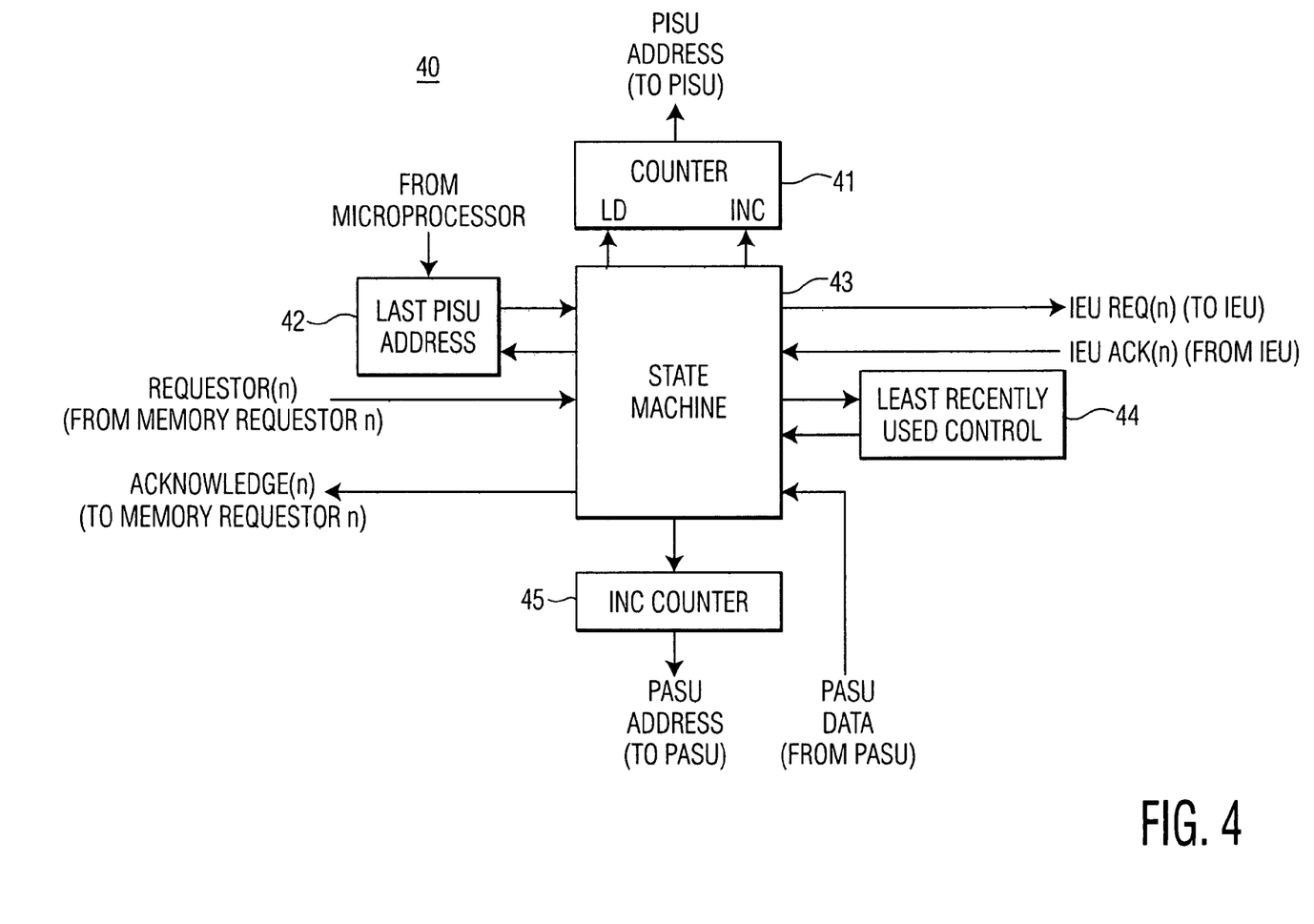
FIG. 4 is a block diagram of a service arbitration unit (SAU) incorporated into the microprogrammable SDRAM controller of FIG. 2, in accordance with an embodiment of the invention.

Referring next to FIG. 4, there is shown an embodiment of an SAU, generally designated as 40. As shown, SAU 40 includes state machine 43 receiving/sending control and status from/to multiple requestors (FIG. 1), the microprocessor (FIG. 1), the PISU (FIG. 2) and the PASU (FIG. 2). When receiving a service request from one or more requestors, state machine 43 enters a state of providing service to the requestor and exits the state by sending a service acknowledge to the requestor.

When servicing the requestor, state machine 43 increments counter 45 and enters a priority determination state by sending the next address (for example address 1 in the programmable schedule shown in Table 1) to the PASU. The state machine exits this state, after receiving the PASU data (namely, a priority service ID) located at the address sent to the PASU.

When the state machine is idle and other requestors are awaiting service, the state machine enters an LRU state and communicates with LRU control 44. The least recently used (LRU) requestor is identified and given service priority. The state machine exits this state, after being informed of the identity of the LRU requestor.

Yet another state is a PISU addressing state entered by state machine 43 upon loading and incrementing counter 41. The counter is loaded at 0 and sequentially advanced, as shown in Table 3. For every increment of counter 41, a corresponding address (sequence position code in Table 4) is output to the PISU (FIG. 2). An execution request (IEU REQ (n)) is sent to the IEU (FIG. 2) for every sequence position code address provided to the PISU. After the IEU executes an instruction corresponding to a sequence position code address, the IEU sends an execution acknowledge (IEU ACK (n)).

The state machine, upon receiving the IEU ACK (n), increments counter 41 and sends the next sequence position code address to the PISU. The sequencing continues, until the last instruction is executed by the IEU for the $n^{th}$ requestor (shown as a service ID in Tables 3 and 4). The occurrence of the last instruction may be determined by state machine 43 upon a comparison between the address sent to the PISU and an address stored in register 42 containing the last PISU address.

Upon detecting the last PISU address and upon receiving an IEU ACK (n), state machine 43 returns to idle and is ready for the next service request from another memory requestor.

Figure 5:
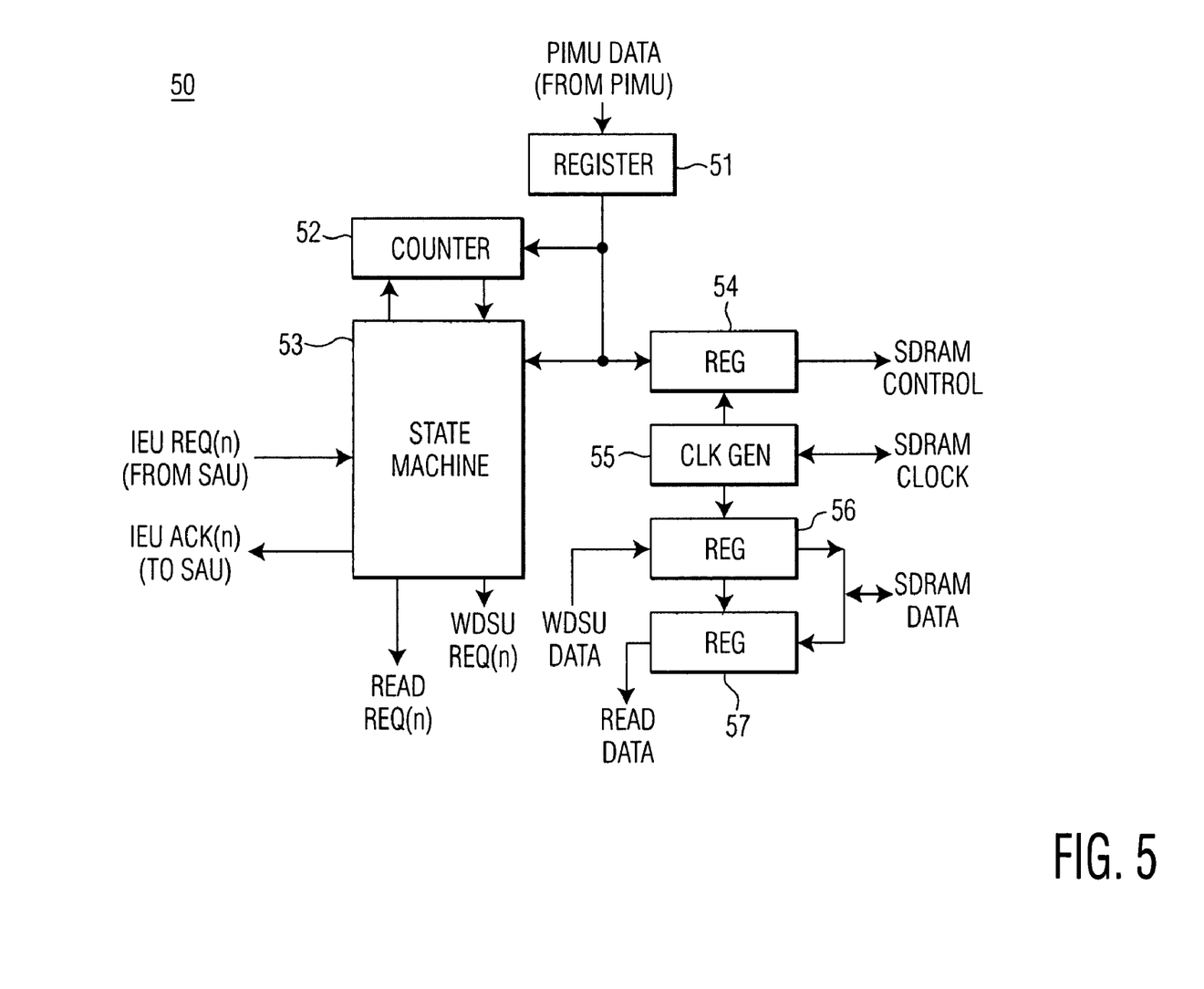
FIG. 5 is a block diagram of an instruction execution unit (IEU) incorporated into the microprogrammable SDRAM controller of FIG. 2, in accordance with an embodiment of the invention.

An embodiment of an IEU is shown in FIG. 5, generally designated as 50. IEU 50 includes state machine 53 servicing state machine 43 (FIG. 4). For every IEU REQ (n) received from state machine 43, instruction data is received from the PIMU (FIG. 2) and stored in register 51. The PIMU data may be 19 bits wide and may include the format shown in Table 6. The instruction duration (6 bits) may be stored in register 52, so that state machine 53 may count down a number of clock cycles to zero, as specified by the instruction duration. Upon completing the PIMU instruction, state machine 53 sends an IEU ACK (n) to state machine 43.

As shown, control bits may be provided to the SDRAM, by way of the EIU (FIG. 2) from register 54. Write data received from a memory requestor, by way of the WDSU (FIG. 2), may be buffered in register 56 and sent to the SDRAM, by way of the EIU. Finally, read data received from the SDRAM, by way of the EIU, may be buffered in register 57. Registers 56 and 57 may each be 32 bits wide, for example.

As shown, state machine 53 may provide a READ REQ (n) to the EIU and enable the EIU to send data from the SDRAM to a memory requestor. State machine 53 may, on the other hand, provide a WDSU REQ (n) to the WDSU, so that the WDSU is enabled and may send data arriving from a memory requestor to the SDRAM, by way of the EIU.

As shown, IEU 50 includes clock generator 55, which provides synchronization to the controller and the SDRAM.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A programmable synchronous dynamic random access memory (SDRAM) controller comprising an arbitration unit for receiving service requests from multiple requestors to access an SDRAM, and a first lookup table of identifiers corresponding to the multiple requestors, the identifiers stored in a first sequence of addresses, wherein the arbitration unit is configured to sequentially access each address in the first sequence of addresses, and grant service to a requestor based on an identifier stored in an address accessed in the first sequence of addresses, and a second lookup table including a second sequence of addresses corresponding to a sequence of instructions, wherein the requestor granted service, based on the first lookup table, is configured to execute the sequence of instructions corresponding to the second sequence of addresses.

2. The SDRAM controller of claim 1 wherein the arbitration unit is configured to sequentially access each address in the first sequence of addresses, beginning at a first address in the first sequence of addresses, and, after acknowledging service to a requestor identified by the first address, access a next address in the first sequence of addresses.

3. The SDRAM controller of claim 1 wherein the addresses in the first lookup table are programmable.

4. An SDRAM controller comprising a service unit for receiving a service request from each of at least one requestor to access an SDRAM and perform a desired SDRAM transaction, a memory for storing instructions at various addresses of the memory, the instructions used for performing a plurality of SDRAM transactions, and a lookup table of a sequence of addresses corresponding to at least a portion of the instructions stored in the memory, the portion of the instructions defining the desired SDRAM transaction, wherein the service unit is configured to execute the desired SDRAM transaction based on the sequence of addresses in the lookup table.

5. The SDRAM controller of claim 4 wherein the service unit is configured to execute a first instruction stored in a first address in the sequence of addresses, and, after executing the first instruction, executing a second instruction stored in a next address in the sequence of addresses.

6. The SDRAM controller of claim 4 wherein the sequence of addresses in the lookup table are programmable, and the instructions stored in the memory are programmable.

7. The SDRAM controller of claim 4 including the service unit for receiving service requests from multiple requestors to access the SDRAM, another lookup table of identifiers corresponding to the multiple requestors, the identifiers stored in another sequence of addresses, and the service unit configured to sequentially access each address in the other sequence of addresses, and grant service to a requestor based on an identifier stored in an address accessed.

8. The SDRAM controller of claim 7 wherein the sequence of addresses in the lookup table are programmable, the instructions stored in the memory are programmable, and the other sequence of addresses in the other lookup table are programmable.

9. A method of controlling access to an SDRAM comprising the steps of:

(a) receiving service requests from multiple requestors to access the SDRAM;

(b) storing a sequence of identifiers in a first lookup table, the identifiers corresponding to the multiple requestors;

(c) sequentially accessing the sequence of identifiers in the first lookup table;

(d) granting a requestor access to the SDRAM based on an identifier accessed in the sequence of identifiers;

(e) storing multiple sequences of instructions in a second lookup table, each sequence of instructions corresponding to one of the multiple requestors; and (f) executing one sequence of instructions stored in the second lookup table that corresponds to the requestor granted access in step (d).

10. The method of claim 9 wherein step (c) includes sequentially accessing the sequence of identifiers beginning at a first identifier in the sequence of identifiers, and step (d) includes granting access to the requestor, if a service request from the requestor is received while accessing an identifier corresponding to the requestor.

11. The method of claim 10 further including the following step:

(g) granting access to another requestor using a least recently used (LRU) rule, if a service request from the other requestor is received while accessing an identifier that corresponds to an inactive requestor.

12. The method of claim 9 wherein step (b) includes programming the sequence of identifiers and storing the programmed sequence of identifiers in the first lookup table.

13. A method of controlling access to an SDRAM comprising the steps of:

(a) receiving a service request from each of at least one requestor to access the SDRAM and perform a desired SDRAM transaction;

(b) storing, in a first memory, instructions at various addresses, the instructions used for performing a plurality of SDRAM transactions;

(c) storing, in a second memory, a sequence of addresses corresponding to at least a portion of the instructions stored in the first memory, the sequence of addresses defining the desired SDRAM transaction; and (d) executing the desired SDRAM transaction based on the sequence of addresses stored in the second memory.

14. The method of claim 13 wherein step (d) includes executing a first instruction stored in a first address in the sequence of addresses, and, after executing the first instruction, executing a second instruction stored in a next address in the sequence of addresses.

15. The method of claim 13 wherein step (b) includes programming instructions and storing the programmed instructions at the various addresses in the first memory; and step (c) includes programming the sequence of addresses and storing the sequence of addresses in the second memory.

16. The method of claim 13 wherein step (a) includes receiving service requests from multiple requestors to access the SDRAM; and the method including the following steps:
(e) storing a sequence of identifiers in a lookup table, the identifiers corresponding to the multiple requestors;
(f) sequentially accessing the sequence of identifiers in the lookup table; and
(g) granting a requestor access to the SDRAM based on an identifier accessed in the sequence of identifiers.

17. The method of claim 16 wherein
step (b) includes programming instructions and storing the programmed instructions at the various addresses in the first memory;
step (c) includes programming the sequence of addresses and storing the sequence of addresses in the second memory; and
step (e) includes programming the sequence of identifiers and storing the sequence of identifiers in the lookup table.

18. A method of programming an SDRAM controller comprising the steps of:
(a) identifying a plurality of requestors to access the SDRAM, wherein each of the requestors is configured to perform a sequence of instructions;
(b) storing, in a first memory, a plurality of instructions for controlling the SDRAM, each instruction stored at a different address in the first memory;
(c) storing, in a second memory, a plurality of sequences of addresses, each sequence of addresses corresponding to a sequence of instructions stored in the first memory; and
(d) performing a sequence of instructions for a requestor by using a sequence of addresses stored in the second memory to execute a corresponding sequence of instructions stored in the first memory.

19. The method of claim 18 including the steps of:
(e) storing, in a third memory, a sequence of identifiers, each identifier in the sequence identifying service priority to a requestor among the plurality of requestors;
(f) sequentially sequencing through the sequence of identifiers; and
(g) granting access to a requestor, if a service request is received from a requestor when the sequencing step is at an identifier identifying service priority to the requestor.

20. The method of claim 19 including the step of:
adaptively modifying at least one of (i) the plurality of instructions in step (b), (ii) the plurality of sequences of addresses in step (c), and (iii) the sequence of identifiers in step (e) in response to a change in the plurality of requestors.

\* \* \* \* \*